United States Patent
Haintze et al.

(10) Patent No.: US 9,260,349 B2
(45) Date of Patent: Feb. 16, 2016

(54) MANNER OF OBTAINMENT OF BINDING AGENT FOR MASS FOR PRODUCTION OF SHAPED CONSTRUCTION ELEMENTS AND BINDING AGENT FOR MASS FOR PRODUCTION OF SHAPED CONSTRUCTION ELEMENTS

(75) Inventors: Andrzej Haintze, Lomianki (PL); Jerzy Haintze, Warsaw (PL)

(73) Assignee: HCH SPOLKA ZO.O., Warsaw (PL)

( * ) Notice: Subject to any disclaimer, the term of this patent is extended or adjusted under 35 U.S.C. 154(b) by 233 days.

(21) Appl. No.: 13/883,708

(22) PCT Filed: Nov. 10, 2011

(86) PCT No.: PCT/PL2011/000115
§ 371 (c)(1),
(2), (4) Date: May 6, 2013

(87) PCT Pub. No.: WO2012/067527
PCT Pub. Date: May 24, 2012

(65) Prior Publication Data
US 2013/0220182 A1    Aug. 29, 2013

(30) Foreign Application Priority Data
Nov. 15, 2010 (PL) .......... 392959

(51) Int. Cl.
*B02C 19/18* (2006.01)
*C04B 40/00* (2006.01)
*B02C 19/00* (2006.01)
*C04B 28/14* (2006.01)

(52) U.S. Cl.
CPC ......... *C04B 40/0021* (2013.01); *B02C 19/0056* (2013.01); *B02C 19/18* (2013.01); *C04B 28/145* (2013.01)

(58) Field of Classification Search
CPC .... B02C 19/00; B02C 19/18; C04B 40/0021; C04B 28/145; C04B 14/30
USPC ...................................... 106/772; 241/1, 301
See application file for complete search history.

(56) References Cited

U.S. PATENT DOCUMENTS

| | | | |
|---|---|---|---|
| 4,444,595 A | 4/1984 | Baines et al. | |
| 4,933,013 A | 6/1990 | Sakai et al. | |
| 2004/0077761 A1 | 4/2004 | Pavez | |

FOREIGN PATENT DOCUMENTS

PL    329432 A1    5/2000

OTHER PUBLICATIONS

Akbari, et al.; "Study on Ultrasonic Vibration Effects on Grinding Process of Alumina Ceramic"; Proceedings of World Academy of Science, Engineering and Technology; Jan. 1, 2008; pp. 785-789; vol. 41; World Academy of Science; Engineering and Technology; Turkey.

Khasanov, et al.; "Dry Powder Compaction under Ultrasonic Action to Shape Nanostructured Bulk Materials"; Euromat-Gongress; Sep. 5, 2005.

*Primary Examiner* — Mark Rosenbaum
(74) *Attorney, Agent, or Firm* — Walker & Jocke

(57) ABSTRACT

The invention solves the problem of obtainment of binding agent for mass of shape constriction elements, consisting of the fact, that preferably calcium sulfate, preferably calcium oxide, preferably zinc oxide, are initially mixed in mechanical mixer, and after thorough mixing, the obtained dry mass shall be subjected to the effects of ultrasonic stationary wave. The binding agent for mass for production of shaped construction elements, in accordance with the invention, consists of 65-86% of weight, preferably of calcium sulfate, 15-35% of weight, preferably of calcium oxide and 0.1-0.7% of weight, preferably of zinc oxide.

20 Claims, 1 Drawing Sheet

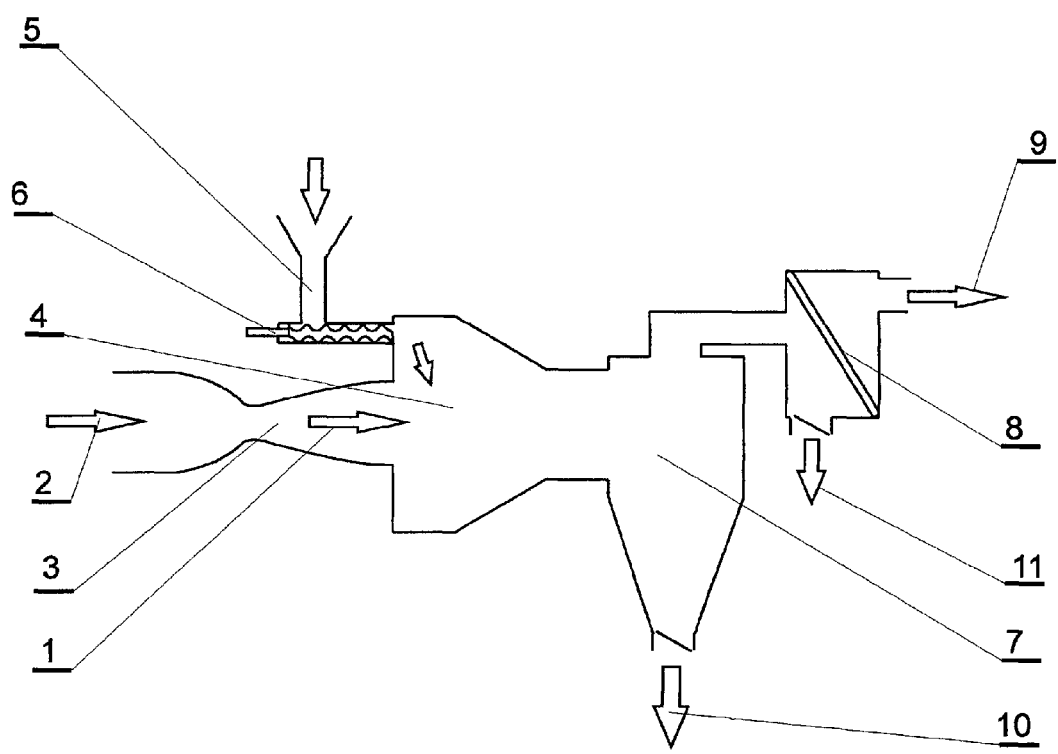

MANNER OF OBTAINMENT OF BINDING AGENT FOR MASS FOR PRODUCTION OF SHAPED CONSTRUCTION ELEMENTS AND BINDING AGENT FOR MASS FOR PRODUCTION OF SHAPED CONSTRUCTION ELEMENTS

CROSS-REFERENCES TO RELATED APPLICATIONS

This application is a national stage entry of PCT/PL2011/000115, which claims the benefit of foreign priority document P 392 9592 filed on 15 Nov. 2010.

BACKGROUND

The subject matter of the invention is the manner of obtainment of binding agent for mass for production of shaped construction elements and binding agent for mass for production of shaped construction elements, which are useful in construction industry, and in particular in production of construction elements in module systems, such as bricks, hollow tiles, fittings.

From the application on the Polish invention no. P-329 432, the manner of production, especially of microporous concrete mass, is known, which is useful for erection of concrete or reinforced concrete constructions.

The manner, according to application no. P-329 432, consists of dry mixing, the powdered activator with powdered, priorly ground waste glass, in proportion of 1.5 to 2.5% activator and 97.5 to 98.5% glass dust. When the mixture obtains a uniform structure, it is poured in thin layer on a belt conveyor moving inside the furnace, and then it is heated to the temperature of 750 to 950° C. for a specified amount of time, and then rapidly cooled down. The dust poured on the conveyor belt, before heating, is grooved, by creating narrow strips connected with a thin layer formed between the poured powder. During rapid cooling, the formed strips crack, forming small lumps of granulated glass. Size of the lumps can be freely shaped depending on the thickness of the formed strips, cooling temperature and contents of activator. The activator allowing for foaming of the ground waste glass and production of such granulated glass is composed of 45 to 95 weight units of silicon carbide and 1 to 10 weight units of carbon, preferably in the form of soot and 20 to 50 weight units of borax or 1 to 10 weight units of manganese oxide or 20 to 26 weight units of lead oxide together with 20 to 26 weight units of copper oxide.

SUMMARY

The essence of the solution in accordance with the invention with regards to the manner of obtaining of binding agent for mass for production of shaped construction elements, consists of the fact that binding substances, preferably calcium sulfate and preferably calcium oxide, and preferably zinc oxide are initially mixed in a mechanical mixer. After thorough mixing, the obtained dry mass is powdered by exposing it to the effects of ultrasonic stationary wave.

The binding agent for mass for production of shaped construction elements, in accordance with the invention, consists of 65-86% of weight, preferably of calcium sulfate, 15-35% of weight, preferably of calcium oxide and 0.1-0.7% of weight, preferably of zinc oxide.

Solution in accordance with the invention gives the possibility to produce mass consisting of ceramic granulate, bound with binding agent, from which through forming a series of unit construction elements can be obtained, such as bricks, hollow tiles, fittings with maintenance of high precision of performance and repetition of individual elements. The contents of the binding agent assures its short initial binding time and high resistant to stressing and resistance to changeable weather conditions. Binding agent, in accordance with the solution, can be used to bind any aggregate grains and ceramic elements. It can also constitute an independent substance for filling of all kinds of construction free spaces. Binding agent can be dyed with natural dyes, which allows for the products produced from it to be dyed into any color, which also means attractiveness of decorative forms.

BRIEF DESCRIPTION OF THE DRAWING

The subject matter of the invention was explained in the performance example in the attached drawing presenting the process of subjecting of dry binding agent mass to ultrasonic stationary wave treatment.

DETAILED DESCRIPTION

Example

In order to obtain 100 kg of binding agent mass for production of shaped construction elements, in accordance with the invention, the following need to be used:
  80.00 kg of hemihydrate calcium sulfate
  19.80 kg of calcium oxide
  0.20 kg of zinc oxide.

In priorly prepared mechanical mixer, mix 80.00 kg of hemihydrate calcium sulfate with 19.80 kg of calcium oxide and with 0.2 kg of zinc oxide until obtainment of uniform mass. When the mixture of components reaches the state of uniformity, it is subjected to treatment with a stream of fast-moving air 1 outgoing from a device for air compressing with channel 2. Compressed air flows through De Laval nozzle 3, where it obtains the speed of M=1 and then it passes to chamber 4, to which through channel 5 and feeding screw 6 dry binding agent mass is dosed, consisting of hemihydrate calcium sulfate, calcium oxide and zinc oxide. Particles of binding agent components subjected to the effects of ultrasonic wave are crumbling heavily as result of rapidly changing air parameters, such as pressure, speed and temperature. The crumbled particles are transported to the separator chamber of cyclone 7 type. In separator 7, solid particles are being separated from air. The air still containing unseparated solid particles of the mixture is directed to the chamber of electrostatic filter 8. After passing through electrostatic filter 8 the air is removed through outlet 9 to the atmosphere. Binding agent ready to be applied, in the form of mass of separated particles of the solid material is directed by vents 10 and 11 to the distributive devices.

The invention claimed is:

1. A binding agent for mass used in production of shaped construction elements, consisting of:
  65-86% by weight of calcium sulfate;
  15-35% by weight of calcium oxide; and
  0.1-0.7% by weight of zinc oxide.

2. The binding agent according to claim 1 wherein the calcium sulfate, calcium oxide, and zinc oxide are mixed and then crumpled by movement in suspension in gas moved at a speed of at least M=1.

3. The binding agent according to claim 1 wherein the calcium sulfate is 65-84% by weight.

4. The binding agent according to claim 3, wherein the weight of the calcium sulfate is 80 kg, wherein the weight of the calcium oxide is 19.8 kg, wherein the weight of the zinc oxide is 0.2 kg.

5. The binding agent according to claim 1, wherein the weight of the calcium sulfate is 80 kg, wherein the weight of the calcium oxide is 19.8 kg, wherein the weight of the zinc oxide is 0.2 kg.

6. A binding agent for mass used in the production of shaped construction elements comprising:
a mixture including:
65-86% by weight of calcium sulfate;
15-35% by weight of calcium oxide; and
0.1-0.7% by weight of zinc oxide,
the mixture being crumpled by having been moved in suspension in gas moved at a speed of at least M=1.

7. The binding agent according to claim 6 wherein the calcium sulfate comprises 65-84% by weight.

8. The binding agent according to claim 7, wherein the weight of the calcium sulfate, calcium oxide, and zinc oxide is proportional to the weight of the calcium sulfate, calcium oxide, and zinc oxide in a 100 kg sample of the binding agent, wherein the weight of the calcium sulfate of the 100 kg sample of the binding agent is 80 kg, wherein the weight of the calcium oxide of the 100 kg sample of the binding agent is 19.8 kg, wherein the weight of the zinc oxide of the 100 kg sample of the binding agent is 0.2 kg.

9. A method for obtaining a binding agent for a mass of shaped construction elements comprising:
a) mixing in a mechanical mixer binding compounds comprising 65-86% by weight of calcium sulfate, 15-35% by weight of calcium oxide, and 0.1-0.7% by weight of zinc oxide; and
b) subjecting the mixed binding compounds to crumbling effects of an ultrasonic stationary wave by suspending the mixed compounds in a gas moving at a speed of at least M=1.

10. The method according to claim 9 wherein in (a) the mixed binding compounds consist of 65-86% by weight of calcium sulfate, 15-35% by weight of calcium oxide, and 0.1-0.7% by weight of zinc oxide.

11. The method according to claim 10 wherein in (a) the weight of the calcium sulfate, calcium oxide, and zinc oxide is proportional to the weight of the calcium sulfate, calcium oxide, and zinc oxide in a 100 kg sample of the binding agent, wherein the weight of the calcium sulfate of the 100 kg sample of the binding agent is 80 kg, wherein the weight of the calcium oxide of the 100 kg sample of the binding agent is 19.8 kg, wherein the weight of the zinc oxide of the 100 kg sample of the binding agent is 0.2 kg.

12. The method according to claim 10 in (a) wherein the calcium sulfate is 65-84% by weight.

13. The method according to claim 9 wherein in (a) the calcium sulfate comprises 65-84% by weight.

14. The method according to claim 9 wherein b) includes suspending the mixed binding compounds in a stream of fast moving air outgoing from a source of compressed air.

15. The method according to claim 14 wherein subjecting the mixed binding compounds to a stream of fast moving air in (b) is performed when the mixed binding compounds have reached a state of uniformity by mixing in (a).

16. The method according to claim 14 wherein in (b) the compressed air flows through a De Laval nozzle.

17. The method according to claim 9 further comprising:
c) separating uncrumbled solid particles of the mixed binding compounds suspended in the moving gas.

18. The method according to claim 17 wherein in c) separating uncrumbled solid particles includes passing moving gas including through an electrostatic filter.

19. The method according to claim 9 wherein in (a) the weight of the calcium sulfate, calcium oxide, and zinc oxide is proportional to the weight of the calcium sulfate, calcium oxide, and zinc oxide in a 100 kg sample of the binding agent, wherein the weight of the calcium sulfate of the 100 kg sample of the binding agent is 80 kg, wherein the weight of the calcium oxide of the 100 kg sample of the binding agent is 19.8 kg, wherein the weight of the zinc oxide of the 100 kg sample of the binding agent is 0.2 kg.

20. A binding agent for mass used in the production of shaped construction elements made by a process comprising:
a) mixing in a mechanical mixer binding compounds comprising 65-86% by weight of calcium sulfate, 15-35% by weight of calcium oxide, and 0.1-0.7% by weight of zinc oxide; and
b) subjecting the mixed binding compounds to crumbling effects of an ultrasonic stationary wave by suspending the mixed compounds in a gas moving at a speed of at least M=1.

* * * * *